(12) United States Patent
Coca et al.

(10) Patent No.: US 8,071,679 B2
(45) Date of Patent: *Dec. 6, 2011

(54) COATING COMPOSITIONS COMPRISING A POLYMER CONTAINING AN OLIGOMERIC MACROMONOMER

(75) Inventors: Simion Coca, Pittsburgh, PA (US); Deborah E. Hayes, Verona, PA (US); Jonathan T. Martz, Glenshaw, PA (US); Karen A. Morow, Verona, PA (US); Calum H. Munro, Wexford, PA (US); Kurt G. Olson, Gibsonia, PA (US); Dennis A. Simpson, Sarver, PA (US); Jane N. Valenta, Pittsburgh, PA (US); Richard J. Winters, Freeport, PA (US); Stephen J. Thomas, Aspinwall, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 171 days.

This patent is subject to a terminal disclaimer.

(21) Appl. No.: 12/040,380

(22) Filed: Feb. 29, 2008

(65) Prior Publication Data

US 2009/0221748 A1   Sep. 3, 2009

(51) Int. Cl.
*C08F 8/00* (2006.01)
*C08G 63/91* (2006.01)

(52) U.S. Cl. ......................................................... 525/55
(58) Field of Classification Search ..................... 525/55
See application file for complete search history.

(56) References Cited

U.S. PATENT DOCUMENTS

| 4,794,144 | A | * | 12/1988 | Spinelli .......................... 525/284 |
| 5,723,511 | A | * | 3/1998 | Kazmaier et al. ............... 522/35 |
| 5,955,532 | A | | 9/1999 | Chang et al. |
| 6,512,056 | B1 | * | 1/2003 | Kennedy et al. ............... 525/314 |
| 2001/0049426 | A1 | * | 12/2001 | Brant ............................. 526/335 |
| 2002/0019472 | A1 | | 2/2002 | Yamashita et al. |
| 2002/0099130 | A1 | * | 7/2002 | McCollum et al. ........... 524/507 |
| 2006/0100351 | A1 | | 5/2006 | Butera et al. |

FOREIGN PATENT DOCUMENTS

| EP | 0 996 652 B | 12/2002 |
| WO | WO 2006115547 A2 * | 11/2006 |

* cited by examiner

*Primary Examiner* — Mark Eashoo
*Assistant Examiner* — David Karst
(74) *Attorney, Agent, or Firm* — Robert A. Diaz; Steven W. Hays; Diane R. Meyers

(57) ABSTRACT

The present invention is directed to a coating composition comprising a polymer that comprises an oligomeric macromonomer and a core from which the oligomeric macromonomer extends, wherein the oligomeric macromonomer comprises reactive functional groups and has an average functionality ranging from 1.0 to 30, and wherein the core is <10 weight % of the total polymer weight.

36 Claims, No Drawings

COATING COMPOSITIONS COMPRISING A POLYMER CONTAINING AN OLIGOMERIC MACROMONOMER

BACKGROUND OF THE INVENTION

1. Field of the Invention

The present invention relates to a coating composition comprising a polymer that comprises an oligomeric macromonomer wherein the oligomeric macromonomer comprises reactive functional groups and has an average functionality ranging from 1.0 to 30.0 depending on the configuration of the polymer.

2. Background Information

A variety of industries (e.g. automotive OEM, industrial) incorporate polymers in various coatings that are used in those industries. For example, in the automotive OEM industry, the coating system (i.e., finish) that is applied onto an automobile or truck body typically comprises an electrodepositable coating layer, a primer surfacer layer deposited onto at least a portion of the electrodepositable coating layer, at least one pigmented basecoat layer deposited onto at least a portion of the primer surfacer layer, and a clear coat layer deposited onto at least a portion of the basecoat layer. Each of these layers result from a coating composition which utilizes polymers as the main film forming component of the coating composition.

Polymers, as well as additives, used in the coatings can vary depending on the type of coating and needs of the user. Coating properties may also vary depending on the type of polymer(s) and/or additives used. There remains a need for coating compositions having improved properties.

SUMMARY OF THE INVENTION

The present invention is directed to a coating composition comprising a polymer that comprises an oligomeric macromonomer and a core from which the oligomeric macromonomer extends, wherein the oligomeric macromonomer comprises reactive functional groups and has an average functionality ranging from 1.0 to 30.0, and wherein the core is <10 weight % of the total polymer weight. The present invention is also directed to a method for making the same.

The present invention is further directed to a coating composition comprising a branched polymer that comprises an oligomeric macromonomer, wherein the oligomeric macromonomer comprises reactive functional groups and has an average functionality ranging from 1.0 to 30.0, and wherein the branched polymer comprises a polymeric backbone from which the oligomeric macromonomer extends. The present invention is also directed to a method for making the same.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "a" polymer, "an" oligomeric macromonomer, "a" branch, a combination (a plurality) of polymers, oligomeric macromonomers, and branches can be used in the present invention.

As used herein, "plurality" means two or more.

As used herein, "includes" and like terms means "including without limitation."

As used herein, the term "cure" refers to a coating wherein any crosslinkable components of the composition are at least partially crosslinked. In certain embodiments, the crosslink density of the crosslinkable components (i.e., the degree of crosslinking) ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As used herein, the term "polyol" or variations thereof refers broadly to a material having an average of two or more hydroxyl groups per molecule. It will be understood, however, that a "polyol" residue or moiety in a reaction product encompasses a material that may have one or more hydroxyl groups per molecule.

Reference to any monomer(s) herein refers generally to a monomer that can be polymerized with another polymerizable compound such as another monomer or polymer. "Monomer components" refer to the monomers used to form a compound such as the oligomeric macromonomer described herein.

When referring to any numerical range of values, such ranges are understood to include each and every number and/or fraction between the stated range minimum and maximum.

As stated above, the present invention is directed to a coating composition comprising a polymer that comprises an oligomeric macromonomer, wherein the oligomeric macromonomer comprises reactive functional groups and has an average functionality ranging per molecule from 1.0 to 30.0. As used herein, "average functionality" can be calculated with the following equation:

$$[X(Y)]/1000$$

wherein "X" is the number average molecular weight of the macromonomer; and "Y" is the number of moles of functional monomer per kilogram of macromonomer.

In certain embodiments, the polymer has a molecular weight that is ≦20,000. In some embodiments, the polymer has a molecular weight of ≧3,000. It should be noted that the molecular weight of the polymer can range between any combination of values, which were recited in the preceding sentences, inclusive of the recited values. For example, in certain embodiments, the molecular weight of the branched polymer can range from 5,000 to 7,000. As used herein, "molecular weight" means weight average molecular weight.

The polymer used in the present invention can have a number of configurations. For example, as will be discussed in greater detail below, the polymer can comprise a polymeric core from which a branch (arm) extends. In other embodiments, the polymer can comprise a polymeric backbone from which a branch extends. Moreover, in certain embodiments, the branch that extends from the polymeric backbone may have an additional branch extending therefrom and this branch may have an additional branch extending therefrom and so on. In these polymers described above, each branch can comprise an oligomeric macromonomer as described herein. Additionally, in the embodiments that comprise a backbone, an oligomeric macromonomer may form a portion or all of the backbone as well as a branch extending from the backbone.

The Oligomeric Macromonomer

In certain embodiments, the oligomeric macromonomer, as used in the present invention, has a terminal ethylenically unsaturated double bond. In certain embodiments, the oligomeric macromonomer has a molecular weight that is ≦5,000. In certain embodiments, the oligomeric macromonomer has a molecular weight of ≧1,000. It should be noted that the molecular weight of the oligomeric macromonomer can range between any combination of values, which were recited in the preceding sentences, inclusive of the recited values. In certain embodiments, the molecular weight of the oligomeric macromonomer can range from 1,000 to 2,000, such as from 1,400 to 1,600. In certain embodiments, the molecular weight of the oligomeric macromonomer can be 1,500.

In certain embodiments, the oligomeric macromonomer described herein comprises ≧5 weight % functionalized monomers, such as ≧20 weight % functionalized monomers. For example, in certain embodiments, the oligomeric macromonomer comprises ≧50 weight % functionalized monomers. As used herein, "functionalized monomers" means a monomer that contains a reactive functional group. The reactive functional groups can include, without limitation, hydroxyl, carboxyl, carbamate, epoxy, isocyanate, aceto acetate, or combinations thereof. The degree of functionality in the oligomeric macromonomer can be varied within the ranges described above (1.0 to 30.0) depending on the desired configuration (architecture) of the polymer, the desired crosslink density of the polymer, and/or the desired physical properties of the coating comprising the polymer. Moreover, it should be noted that the oligomeric macromonomer may also comprise two or more different reactive functional groups. For example, the oligomeric macromonomer may comprise both epoxy and hydroxyl reactive functional groups.

In certain embodiments, the oligomeric macromonomer can comprise a cationic salt group, which is generally prepared by neutralizing a functional group on the oligomeric macromonomer with an acid thereby enabling the polymer comprising the oligomeric macromonomer to be electrodeposited onto a cathode. In certain embodiments, formation of the cationic salt group is achieved by reacting an epoxy functional oligomeric macromonomer with a cationic salt group former. As used herein "cationic salt group former" means a material which is reactive with an epoxy group and which can be acidified before, during, or after reaction with the epoxy group thereby forming a cationic salt group. Examples of suitable materials include amines, such as primary or secondary amines, which can be acidified after reaction with the epoxy group to form an amine salt group, or tertiary amines which can be acidified prior to reaction with the epoxy group and which, after reaction with the epoxy group, form a quaternary ammonium salt group. Examples of other cationic salt group formers are sulfides which can be mixed with acid prior to reaction with the epoxy group thereby forming a ternary sulfonium salt group upon subsequent reaction with the epoxy group. It should also be noted that the formation of the cationic salt group can occur before or after the oligomeric macromonomer has been incorporated into the polymer used in the present invention.

The oligomeric macromonomer described herein is the reaction product of (a) a monomer comprising an $\alpha$-hydrogen ($\alpha$-hydrogen containing monomer); (b) a free radical polymerization initiator; and optionally, (c) a monomer that is polymerizable with (a). Any suitable (a) $\alpha$-hydrogen containing monomers may be used to form the oligomeric macromonomer. Suitable (a) $\alpha$-hydrogen containing monomers include, without limitation, acrylate, for example, acryalte; alkyl acryalte: including, but not limited to, methyl acrylate, ethyl acrylate, isobutyl acrylate; functional acrylate such as hydroxy functional acrylate which includes, without limitation, hydroxy alkyl acrylate: including, but not limited to, hydroxy propyl acrylate and hydroxy ethyl acrylate; acrylonitrile; olefins; styrene; $\alpha$-olefins; vinyl esters; maleimide; maleate, fumarate; or combinations thereof. Any suitable monomer may be used as component (c) so long as the monomer is polymerizable with component (a). For example, component (c) can comprise an $\alpha$-hydrogen containing monomer (which can be different from the one used in component (a)), a non-$\alpha$-hydrogen containing monomer, or combinations thereof. Suitable non-$\alpha$-hydrogen containing monomers that may be utilized to form the oligomeric macromonomer include, without limitation, methacrylate, for example, methacrylate; alkyl methacrylate: including but not limited to, methyl methacrylate, ethyl methacrylate, butyl methacrylate, isobutyl methacrylate; epoxy functional methacrylate, such as glycidyl methacrylate; hydroxy functional methacrylate which includes, without limitation, hydroxy alkyl methacrylate: including, but not limited to, hydroxy propyl methacrylate and hydroxy ethyl methacrylate; isobutylene; $\alpha$-methyl styrene; or combinations thereof. Other suitable monomers that may be used as component (c) include, without limitation, vinyl chloride; diene: including, but not limited to butyl diene or isoprene; or combinations thereof.

Any suitable initiators may be used as component (b). These initiators include, without limitation, ditertiary-amyl peroxide, ditertiary-butyl peroxide, hydrogen peroxide, tertiary butyl hydroperoxide, or combinations thereof. In certain embodiments, the use of azo initiators is specifically excluded.

The oligomeric macromonomer may be formed by any means known in the art. In certain embodiments, the oligomeric macromonomer is formed in a continuous process. In certain embodiments, when using a continuous process, a yield of ≧90%, such as ≧95%, of the oligomeric macromonomer is achieved. In certain embodiments, when using a continuous process, the process utilizes no transition metals, such as cobalt, to drive the formation of the oligomeric macromonomer. In certain embodiments, when using a continuous process, the formation of the oligomeric macromonomer occurs in a substantially solvent free environment. As used herein, a "substantially solvent free environment" means that trace or incidental amounts of organic solvent, such as ≦5 weight % or ≦3 weight % or ≦1 weight % based on all of the ingredients used in the reaction mixture, can be present. One advantage of forming the oligomeric macromonomer using a process that is free of transition metals and/or solvent is that such process is more environmentally friendly when compared to a process that utilizes transition metals and/or solvents.

Any continuous process can be used to form the oligomeric macromonomer. In one embodiment, the continuous process begins by charging a reaction vessel with the (a) $\alpha$-hydrogen containing monomer; the (b) free radical polymerization initiator; and, optionally, the (c) monomer that is polymerizable with (a). The molar ratio of the (a) $\alpha$-hydrogen containing monomer to the (c) monomer, when used, can be in any desired range, such as from 1:50 to 1:5. In certain embodiments, the amount of (b) initiator that is charged into the reaction vessel is ≦10 weight %, such as ≦5 weight % or ≦1 weight %, based on the total weight of the ingredients that are charged into the reaction vessel.

In certain embodiments, the oligomeric macromonomer may be formed only from a single type of (a) $\alpha$-hydrogen containing monomer. For example, the oligomeric macromonomer can be formed only from hydroxy propyl acrylate.

After components (a), (b), and, optionally, (c) are charged into the reaction vessel, which can be a continuous stirred-tank reactor (CSTR), the reaction vessel is heated to a temperature that is >130° C., such as from 130° C. to 300° C., for a time period (residence time) ranging from 2 minutes to 20 minutes. In certain embodiments, the pressure of the reaction vessel during the formation of the oligomeric macromonomer ranges from 50 psi to 15,000 psi. One skilled in the art will recognize that the molecular weight of the oligomeric macromonomer can be controlled by adjusting the temperature that is applied to the reaction vessel (reaction temperature) as well as the amount of initiator that is charged into the reaction vessel.

Polymer Configuration

As stated above, the polymer that is used in the present invention can have a variety of configurations. For example, in one embodiment, the polymer can be a polymer with a polymeric core wherein an arm extends from the polymeric core. In other embodiments, the polymer can comprise a branch that extends from a polymeric backbone. That branch may comprise an additional branch that extends therefrom and this additional branch may also comprise a branch.

The polymers that are used in the present invention, regardless of configuration, are the free radical polymerization reaction products of an oligomeric macromonomer, which is described above, with one or more monomers and/or polymers. The polymers can have a molecular weight ranging from ranging from 3,000 to 20,000. In certain embodiments, the molecular weight of the polymer is 6,000.

Even though reference is made herein to a polymer comprising an oligomeric macromonomer, one skilled in the art would appreciate that after the polymerization process, the polymer will comprise a residue of the oligomeric macromonomer described above. Additionally, one skilled in the art would also recognize that after the polymerization process, the polymer will also comprise residues of the other components (e.g., other monomers or polymers and initiator) used to form the polymer.

Although the polymer is generally described herein in terms of "a" polymer comprising "an" oligomeric macromonomer, the polymer can comprise a plurality of oligomeric macromonomers. In embodiments wherein a plurality of components (i.e., oligomeric macromonomer, monomer, and/or polymers) are used to form the polymer, each component can have the same functionality (reactive functional groups). In other embodiments, however, at least one component has a different functionality than another component. For example, in embodiments where a plurality of oligomeric macromonomers is used to form the polymer, one oligomeric macromonomer can comprise a hydroxyl reactive functional group while another oligomeric macromonomer can comprise an epoxy reactive functional group. In certain embodiments, a single oligomeric macromonomer can comprise two different reactive functional groups. For example, an oligomeric macromonomer used to form the polymer can comprise both hydroxyl and epoxy reactive functional groups. Accordingly, in certain embodiments, one oligomeric macromonomer can comprise both hydroxyl and epoxy reactive functional groups while another oligomeric macromonomer may only comprise an epoxy functional group.

Additionally, in certain embodiments, one component used to form the polymer may have the same $T_g$ and/or molecular weight as the other components used to form the polymer or one component may have a different $T_g$ and/or molecular weight from another component used to form the polymer.

Moreover, it should also be noted that when a plurality of oligomeric macromonomers are used to form the polymers described herein, at least one oligomeric macromonomer can be comprised of the same or different monomer components as another oligomeric macromonomer; similarly, at least one oligomeric macromonomer can have the same or different ratio of monomer components as another oligomeric macromonomer. For example, in certain embodiments, a polymer can comprise two oligomeric macromonomers that are formed from a reaction mixture comprising the same acrylate, isobutylene, and initiator. In these embodiments, where the same monomers are used, the ratio of monomers can be the same or different. For example, the oligomeric macromonomers used to form the polymer can comprise 50% ethyl acrylate and 50% glycidyl methacrylate, or one oligomeric macromonomer can comprise 50% ethyl acrylate and 50% glycidyl methacrylate while another oligomeric macromonomer can comprise 60% ethyl acrylate and 40% glycidyl methacrylate. In other embodiments, however, at least one oligomeric macromonomer is comprised of monomer components that are different from another oligomeric macromonomer that is used to form the polymer. For example, one oligomeric macromonomer can comprise 50% ethyl acrylate and 50% glycidyl methacrylate while another macromonomer can comprise 50% acrylate and 50% hydroxy propyl methacrylate. In these embodiments, where different monomers are used, the ratio of monomers can be the same or different. For example, one oligomeric macromonomer can comprise 50% ethyl acrylate and 50% glycidyl methacrylate while another macromonomer can comprise 40% acrylate and 60% hydroxy propyl methacrylate. If a plurality of oligomeric macromonomers is used, the oligomeric macromonomers may have the same or different $T_g$ and/or molecular weight. For example, in certain embodiments, all of the oligomeric macromonomers may have the same $T_g$ or one oligomeric macromonomer may have a different $T_g$ than another oligomeric macromonomer.

In certain embodiments of the present invention, the polymers described herein can comprise one or more oligomeric macromonomers wherein the oligomeric macromonomers can have a molecular weight that is $\leq 5,000$, such as $\leq 2,000$, in order to avoid entanglement of the various oligomeric macromonomers with one another.

Polymer Comprising a Core

In certain embodiments, the polymer comprises a core with an oligomeric macromonomer extending from the core. Although reference is made to a polymer that comprises "an" oligomeric macromonomer, as noted above, the polymer can comprise a plurality of oligomeric macromonomers. In certain embodiments, the polymer comprises an arm that comprise the oligomeric macromonomer described herein, and an arm that comprises other monomer(s) and/or polymer(s). In certain embodiments, the oligomeric macromonomer has an average functionality ranging from 1.0 to 30.0, such as 1.5 to 8.0. In certain embodiments, the polymer comprises $\geq 4$ weight %, such as $\geq 20$ weight %, functionalized monomers.

The polymer described in this section can be formed by any means known in the art. In certain embodiments, the polymer described in this section can be formed by the free radical polymerization of an oligomeric macromonomers as described herein with a monomer comprising at least two ethylenically unstaturated double bonds (which forms at least a portion of the core) and a free radical polymerization initiator, such as those initiators described above. The free radical polymerization initiator that is used to polymerize the core and the oligomeric macromonomer can be the same or different as the free radical polymerization initiator that is used to form the oligomeric macromonomer. Suitable monomers comprising at least two ethylenically unsaturated double bonds include, without limitation, di(meth)acrylate; including, but not limited to, 1,6 hexanediol di(meth)acrylate, ethylene glycol di(meth)acrylate; trimethyol propane tri(meth)acryalte; pentaeritrytol tetra(meth)acrylate; dipentacritrytol hexa(meth)acrylate; ditrimethylol propane tetra(meth)acrylate; maleate polyester; ethylene glycol; bis-acrylamide; or combinations thereof.

The core of the polymer comprises <10 weight % of the total weight of the polymer. For example, in certain embodiments, the weight % of the core is $\leqq 5$ weight %, such as 3 weight %, of the total polymer weight. If the core comprises >10 weight % of the total weight of the polymer, the possibility of gelling increases dramatically.

In certain embodiments, an oligomeric macromonomer used to form the polymer described in this section can comprise $\geqq 5$ weight %, such as 20 weight %, functionalized monomers. In certain embodiments, the oligomeric macromonomer comprises 22 weight % functionalized monomers. Moreover, in certain embodiments, the oligomeric macromonomers can comprise >90 weight %, such as $\geqq 95$ weight %, of the total polymer weight.

Branched Polymer

In certain embodiments, the polymer used in the present invention is a branched polymer comprising a backbone from which a branch extends. Although reference is made to a branched polymer that comprises "a" branch, it is noted that the branched polymer can comprise one or more branches. A branch can comprise the oligomeric macromonomer as described above. In certain embodiments, the backbone may also comprise all or part of an oligomeric macromonomer while one or more of these branches may, in certain embodiments, comprise other monomer(s) and/or polymer(s). In certain embodiments, the oligomeric macromonomer has an average functionality ranging from 1.0 to 30.0, such as 1.5 to 16.0. In certain embodiments, the branched polymer comprises $\geqq 20$ weight %, such as $\geqq 50$ weight %, branched functionalized monomers.

The polymer described in this section can be formed by any means known in the art. However, in certain embodiments, the branched polymer can be formed by the free radical polymerization of the oligomeric macromonomer with a monomer that comprises one ethylenically unsaturated double bond and a free radical polymerization initiator such as those described above. The free radical polymerization initiator that is used to polymerize the oligomeric macromonomer and the backbone can be the same or different as the free radical polymerization initiator that is used to form the oligomeric macromonomer. Any monomer comprising one ethylenically unsaturated double bond can be used to form the branched polymer. Suitable monomers include, without limitation, the α-hydrogen containing monomers and the non-α-hydrogen containing monomers described above. In addition, the backbone may comprise random, alternating, or block monomeric units. In certain embodiments, the backbone may further comprise all or part of an oligomeric macromonomer as described herein.

In certain embodiments, the polymerization of the oligomeric macromonomer with the monomer that comprises one ethylenically unsaturated double bond and the free radical polymerization initiator can occur in a substantially solvent free environment.

In certain embodiments, one or more of the oligomeric macromonomers used to form the branched polymer can comprises $\geqq 5$ weight % functionalized monomers, such as $\geqq 50$ weight % functionalized monomers. For example, in certain embodiments, the oligomeric macromonomer comprises 63 weight % functionalized monomers.

Hyper-Branched Polymer

In certain embodiments, the polymer is a hyper-branched polymer that comprises a backbone from which a branch (primary branch) extends, and wherein the primary branch has an additional branch extending therefrom (secondary branch). As used herein, a branched polymer, therefore, further includes the hyper-branched polymer described herein. In turn, in certain embodiments, the secondary branch can also have a branch (tertiary branch) extending therefrom. It should be noted that each subsequent branch (e.g., tertiary branch, quaternary branch, $n^{th}$ branch) in the hyper-branched polymer may have an additional branch extending therefrom. Although reference is made to a hyper-branched polymer that comprises "a" branch (primary branch, secondary branch, tertiary branch, etc . . . ), it is noted that the hyper-branched polymer can comprise one or more branches and that each branch may comprise one or more additional branches.

The hyper-branched polymer can be formed by any means known in the art. In certain embodiments, the hyper-branched polymer can be formed in the same manner as the branched polymer described above except that an additional monomer, which comprises at least two ethylenically unsaturated double bonds (such as those described above), is added to the reaction mixture.

The secondary branch may be formed by the free-radical addition reaction of an oligomeric macromonomer or a monomer comprising at least two ethylenically unsaturated double bonds described herein with a radical on a primary branch of the hyper-branched polymer. Moreover, a tertiary branch may be formed by the free-radical addition reaction of an oligomeric macromonomer or a monomer comprising at least two ethylenically unsaturated double bonds described herein with a radical on the secondary branch, and so on.

It should also be noted that the weight % functionalized monomers of the one or more of the oligomeric macromonomers as well as the weight % functionalized monomers of the total polymer can fall within the ranges that are described for the branched polymer in the preceding paragraphs.

Coating Composition

A coating composition can comprise one or more of the polymers described above. The coating composition may be a water-based or solvent-based liquid composition, or, alternatively, may be in solid particulate form (i.e., a powder coating). It has surprisingly been found that coating compositions incorporating one or more of the polymers described above exhibit physical characteristics that are equal to or surpass coating compositions known in the art, while possibly providing one or more benefits over such coating compositions. For example, the coating composition can have lower viscosities as compared to coating compositions that do not use the polymers described herein. One skilled in the art will appreciate that a coating having a lower viscosity may have application advantages and also may have better appearance characteristics when compared to coating compositions that have higher viscosities. Another benefit from using one or more of the polymers described above in a coating composition is that the total amount of a curing agent (crosslinking agent) used to cure (crosslink) the coating composition may be reduced. This is because the polymers of the present invention can achieve a crosslink density, when cured, which cannot be achieved in other coatings without increasing the number of reactive functional groups in those coatings. This increase in the number of reactive functional groups would, therefore, require an increase in the total amount of curing agent.

In certain embodiments, the coating composition comprises: (1) one or more of the polymers described above; and (2) a curing agent that is reactive with a reactive functional group of the oligomeric macromonomer. In certain embodiments, the curing agent comprises ≧5 weight %, such as from 10 weight % to 50 weight % or from 15 weight % to 30 weight %, based on the total solid content the coating composition. Suitable curing agents include, without limitation, aminoplasts, polyisocyanates (including blocked isocyanates), polyepoxides, beta-hydroxyalkylamides, polyacids, anhydrides, organometallic acid-functional materials, polyamines, polyamides, and mixtures of any of the foregoing.

The coating composition can further comprise one or more additional film-forming polymers. The additional film-forming polymer has functional groups that are reactive with either themselves or a crosslinking agent, such as those described above. The additional film-forming polymer can be selected from, for example, acrylic polymers, polyester polymers, polyurethane polymers, polyamide polymers, polyether polymers, polysiloxane polymers, copolymers thereof, and mixtures thereof. Generally, these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, without limitation, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

It will be further appreciated that the coating composition described herein can be either "one component" ("1K"), "two component" ("2K"), or even multi-component compositions. A 1K composition will be understood as referring to a composition wherein all of the coating components are maintained in the same container after manufacture, during storage, etc. A 1K coating can be applied to a substrate and cured by any conventional means, such as by heating, forced air, and the like. The present coatings can also be 2K coatings or multi-component coatings, which will be understood as coating in which various components are maintained separately until just prior to application.

In certain embodiments, the polymer described herein can be used in an electrodepositable coating composition that can be electrodeposited directly onto at least a portion of a substrate or onto a least a portion of an underlying coating layer or an underlying coating composition, such as an underlying pretreatment layer. For example, the polymers can be incorporated into the coating composition that is described in U.S. patent application Ser. No. 11/835,600, which is incorporated herein in its entirety by reference. In certain embodiments, the polymer used in the present invention can comprise a cationic salt group, as described above, which allows the polymer to be deposited onto a cathode (cathodic electrodeposition). It is noted that the electrodepositable coating composition can impart corrosion protection to the substrate onto which it is deposited.

In certain embodiments, the polymer described herein can be used in a primer coating composition that can be applied directly onto at least a portion of a substrate or onto at least a portion of an underlying coating layer or an underlying coating composition. For example, the polymers described herein can be incorporated into the coating composition that is described in U.S. patent application Ser. No. 11/773,482, which is incorporated herein in its entirety by reference. The primer coating composition can either be a primer-surfacer coating composition or an anti-chip primer coating composition. It is noted that the primer coating composition can impart chip resistance properties to the substrate onto which it is deposited.

In certain embodiments, the polymer of the present invention can be used in a color-imparting non-hiding (basecoat) coating composition that can be applied directly onto at least a portion of a substrate or onto at least a portion of any underlying coating layer or an underlying coating composition. The basecoat composition comprises a colorant, such as those described below, which results in a colored coating layer that can be deposited onto the substrate.

In certain embodiments, the polymers of the present invention can be used in a substantially clear coating composition (clearcoat). As used herein, a "substantially clear" coating composition is substantially transparent and not opaque. In certain embodiments, the substantially clear coating composition can comprise a colorant but not in an amount such as to render the clear coating composition opaque (not substantially transparent). The substantially clear coating composition can also comprise a particle, such as a silica particle, that is dispersed in the clearcoat coating composition. In certain embodiments, the clearcoat coating composition may further comprise a surface active agent such as a polysiloxane and/or a fluoropolymer. As used herein, "surface active agent" means any material which tends to lower the solid surface tension or surface energy of the cured composition or coating. That is, the cured composition or coating formed from a composition comprising a surface active agent has a lower solid surface tension or surface energy than a cured coating formed from the analogous composition which does not contain the surface active agent. For example, the polymer of the present invention can be incorporated into a coating composition that is described in U.S. Pat. No. 6,387,519 B1, which is incorporated in its entirety herein by reference.

In certain embodiments, for example, the clearcoat coating composition can comprise a polymer, as described herein, which comprises a hydroxyl and/or carbamate functional group, and a melamine curing agent.

In certain embodiments, the coating composition can include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating composition of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating composition of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

The coating composition described herein is suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof. In certain embodiments, the substrate onto which the coating composition is applied may comprise a portion of a vehicle such as a vehicular body (e.g., without limitation, door, body panel, trunk deck lid, roof panel, hood, and/or roof) and/or a vehicular frame. As used herein, "vehicle" or variations thereof includes, but is not limited to, civilian, commercial, and military land vehicles such as cars, motorcycles, and trucks.

Examples of suitable silicatic substrates are glass, porcelain and ceramics. Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g., velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminum derivatives, quebracho, chestnut or mimosa extracts, aromatic syntans, polyurethanes, (co) polymers of (meth) acrylic acid compounds or melamine/, dicyanodiamide/and/or urealformaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The coating composition can be deposited or applied onto a substrate using any technique that is known in the art. For example, the coating composition can be applied to the substrate by any of a variety of methods including, without limitation, spraying, brushing, dipping, and/or roll coating, among other methods. When a plurality of coating compositions are applied onto a substrate, it should be noted that one coating composition may be applied onto at least a portion of an underlying coating composition either after the underlying coating composition has been cured or prior to the underlying coating composition being cured. If the coating composition is applied onto an underlying coating composition that has not been cured, both coating compositions may be cured simultaneously.

The coating composition may be cured using any technique that is known in the art. For example, the coating composition may be cured using curing methods including, but not limited to, thermal energy, infrared, ionizing or actinic radiation, or by any combination thereof. In some embodiments, the curing operation can be carried out at temperatures $\geqq 10°$ C. (50° F.). In other embodiments, the curing operation can be carried out at temperature $\leqq 246°$ C. (475° F.). In certain embodiments, the curing operation can carried out at temperatures ranging between any combination of values, which were recited in the preceding sentences, inclusive of the recited values. For example, the curing operation can be carried out at temperatures ranging from 121.1° C. (250° F.)-148.9° C. (300° F.). It should be noted, however, that lower or higher temperatures may be used as necessary to activate the curing mechanisms.

In certain embodiments, the coating composition described herein is a low temperature, moisture curable coating compositions. As used herein, the term "low temperature, moisture curable" refers to coating compositions that, following application to a substrate, are capable of curing in the presence of ambient air, the air having a relative humidity of 10% to 100%, such as 25% to 80%, and a temperature in the range of −10° C. to 120° C., such as 5° C. to 80° C., in some cases 10° C. to 60° C. and, in yet other cases, 15° C. to 40° C.

The dry film thickness of the coating that results from the coating composition described herein can range from 0.1 micron to 500 microns. In other embodiments, the dry film thickness can be $\leqq 125$ microns, such as $\leqq 80$ microns. For example, the dry film thickness can range from 15 microns to 60 microns.

In certain embodiments, one or more coating compositions used to form a coating layer system, which is deposited onto a substrate, comprise the polymers described herein. For example, in certain embodiments, the coating layer system that is deposited onto the substrate can comprises an electrodepositable coating layer deposited onto at least a portion of the substrate; a basecoat coating layer deposited onto at least a portion of the electrodepositable coating layer; and a substantially clear coating layer deposited onto at least a portion of the basecoat coating layer. It should be noted that the substrate may be pretreated with a pretreatment solution, such as a zinc phosphate solution as described in U.S. Pat. Nos. 4,793,867 and 5,588,989, which are incorporated herein in their entirety by reference, or not pretreated with a pretreatment solution prior to application of the electrodepositable coating composition.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Macromonomer

Example 1

|  | Ingredients | Total Mass (grams) |
|---|---|---|
| Charge 1 | Isobutylene | 2959.7 |
| Charge 2 | Di-t-amyl peroxide | 112.5 |
|  | Hydroxypropyl acrylate | 2849.6 |
|  | a-Methyl styrene | 1773.4 |
|  | Methyl acrylate | 3082.0 |
|  | Isobutyl acrylate | 1186.3 |

Charge 1 was added to 600 cc stirred stainless steel pressure reactor at 6.2 g/min. Start add Charge 2 to 600 cc stirred stainless steel pressure reactor at 19.7 ml/min. The agitation on the reactor was set at 500 rpm and the reactor temperature was adjusted to 220 C. During the monomer addition the temperature was maintained 220 C at pressure of 400-600 psi. The final solids of the resulting macromonomer was determined to be 99.5% determined at 110° C. for one hour. The macromonomer had number average molecular weight, $M_n$=1600, $M_w$=3670 and polydispersity $M_w/M_n$=2.3, $M_z$=6850 (determined by gel permeation chromatography using polystyrene as a standard). The hydroxyl number was 94.

Example 2

|  | Ingredients | Total Mass (grams) |
|---|---|---|
| Charge 1 | Glycidyl methacrylate | 294.00 |
|  | a-Methyl styrene | 6.00 |
|  | Methyl acrylate | 200.00 |
|  | Butyl acrylate | 50.00 |
|  | Isobutyl acrylate | 50.00 |
| Charge 2 | Di-t-amyl peroxide | 10.00 |
| Charge 3 | Dowanol PM acetate | 210.00 |

Charge 1 and 2 were added to 1-liter stirred stainless steel pressure reactor over 20 min. The agitation on the reactor was set at 500 rpm and the reactor temperature was adjusted to 220° C. During the monomers and initiator addition the temperature was maintained 220° C. at 100-150 psi. The reactor was than cooled to 100° C. and Charge 3 was added to the reactor. The final solids of the resulting macromonomer was determined to be 73.8% determined at 110° C. for one hour. The macromonomer had number average molecular weight, $M_n$=1340, $M_w$=2400 and polydispersity $M_w/M_n$=1.8, $M_z$=4100 (determined by gel permeation chromatography using polystyrene as a standard). The epoxy equivalent weight was 440.

Example 3

|  | Ingredients | Total Mass (grams) |
|---|---|---|
| Charge 1 | Glycidyl methacrylate | 150.00 |
|  | Hydroxypropyl acrylate | 150.00 |
|  | Ethyl acrylate | 150.00 |
|  | a-Methyl styrene | 60.00 |
|  | Isobutyl methacrylate | 90.00 |
| Charge 2 | Di-t-amyl peroxide | 10.00 |
| Charge 3 | Amyl propionate solvent | 210.00 |

Charge 1 and 2 were added to 1-liter stirred stainless steel pressure reactor over 20 min. The agitation on the reactor was set at 500 rpm and the reactor temperature was adjusted to 220° C. During the monomers and initiator addition the temperature was maintained 220° C. at 100-140 psi. The reactor was than cooled to 100° C. and Charge 3 was added to the reactor. The final solids of the resulting macromonomer was determined to be 73.7% determined at 110° C. for one hour. The macromonomer had number average molecular weight, $M_n$=1400, $M_w$=3360 and polydispersity $M_w/M_n$=2.4, $M_z$=7800 (determined by gel permeation chromatography using polystyrene as a standard). The epoxy equivalent weight was 840 and hydroxyl value 62.

Example 4

|  | Ingredients | Total Mass (grams) |
|---|---|---|
| Charge 1 | Methacrylic acid | 30.00 |
|  | Hydroxypropyl methacrylate | 100.00 |
|  | Methyl acrylate | 236.00 |
|  | a-Methyl styrene | 194.00 |
|  | Isobutyl acrylate | 40.00 |
| Charge 2 | Di-t-amyl peroxide | 10.00 |
| Charge 3 | Dowanol PM acetate | 210.00 |

Charge 1 and 2 were added to 1-liter stirred stainless steel pressure reactor over 20 min. The agitation on the reactor was set at 500 rpm and the reactor temperature was adjusted to 220° C. During the monomers and initiator addition the temperature was maintained 220° C. at 100-140 psi. The reactor was than cooled to 50° C. and Charge 3 was added to the reactor. The final solids of the resulting macromonomer was determined to be 73.7% determined at 110° C. for one hour. The macromonomer had number average molecular weight, $M_n$=1900, $M_w$=4760 and polydispersity $M_w/M_n$=2.5, $M_z$=10100 (determined by gel permeation chromatography using polystyrene as a standard). The acid number was 22 and hydroxyl value was 44.

Example 5

| | Ingredients | Total Mass (grams) |
|---|---|---|
| Charge 1 | Hydroxypropyl acrylate | 160.00 |
| | Methyl acrylate | 44.00 |
| | a-Methyl styrene | 164.00 |
| Charge 2 | Di-t-amyl peroxide | 5.00 |
| Charge 3 | Xylene | 165.00 |

Charge 1 and 2 were added to 1-liter stirred stainless steel pressure reactor over 20 min. The agitation on the reactor was set at 500 rpm and the reactor temperature was adjusted to 220° C. During the monomers and initiator addition the temperature was maintained 220° C. at 100-140 psi. The reactor was than cooled to 50 C and Charge 3 was added to the reactor. The final solids of the resulting macromonomer was determined to be 69.5% determined at 110° C. for one hour. The macromonomer had number average molecular weight, $M_n=2310$, $M_w=5170$ and polydispersity $M_w/M_n=2.2$, $M_z=8570$ (determined by gel permeation chromatography using polystyrene as a standard). The hydroxyl value was 128.

Example 6

| | Ingredients | Total Mass (grams) |
|---|---|---|
| Charge 1 | Isobutylene | 400.00 |
| Charge 2 | Di-t-amyl peroxide | 11.40 |
| Charge 3 | Hydroxypropyl Acrylate | 480.00 |
| | 2-Hydroxyethyl acrylate | 480.00 |
| | Butyl acrylate | 240.00 |

Charge 1 was added to 300 cc stirred stainless steel pressure reactor at 400 g/hour. Start pumping Charge 2 and 3 simultaneously to 300 cc stirred stainless steel pressure reactor at 11.40 g/hour and 1200 g/hour respectively. The agitation on the reactor was set at 500 rpm and the reactor temperature was adjusted to 225° C. During the monomer addition the temperature was maintained 220° C. at pressure of 400-600 psi. The final solids of the resulting macromonomer was determined to be 99.6% determined at 110° C. for one hour. The macromonomer had number average molecular weight, $M_n=1980$, $M_w=5580$ and polydispersity $M_w/M_n=2.8$, $M_z=15180$ (determined by gel permeation chromatography using polystyrene as a standard). The hydroxyl number was 287.

Example 7

| | Ingredients | Total Mass (grams) |
|---|---|---|
| Charge 1 | Isobutylene | 150.00 |
| Charge 2 | Di-t-amyl peroxide | 6.00 |
| Charge 3 | 4-Hydroxybutyl Acrylate | 72.00 |
| | a-Methyl styrene | 90.00 |
| | Butyl acrylate | 288.00 |
| Charge 4 | Butyl acetate | 90.00 |

Charge 1, 2 and 3 were added to 1-liter stirred stainless steel pressure reactor over 20 min. The agitation on the reactor was set at 500 rpm and the reactor temperature was adjusted to 220° C. During the monomers and initiator addition the temperature was maintained 220° C. at 100-700 psi. The reactor was than cooled to 50° C. and Charge 4 was added to the reactor. The final solids of the resulting macromonomer was determined to be 86.7% determined at 110° C. for one hour. The macromonomer had number average molecular weight, $M_n=2130$, $M_w=5420$ and polydispersity $M_w/M_n=2.5$, $M_z=9710$ (determined by gel permeation chromatography using polystyrene as a standard). The hydroxyl value was 41.

Polymer Comprising Core Examples

Example 8

| | Ingredients | Total Mass (grams) |
|---|---|---|
| Charge 1 | Example 1 | 11963.5 |
| Charge 2 | Di-t-amyl peroxide | 256.8 |
| Charge 3 | 1,6 Hexanediol diacrylate | 366.9 |
| Charge 4 | Aromatic 100 solvent | 2400 |

Example 1 was added to second reactor 300 cc stirred stainless steel pressure reactor at 25.9 g/min. Charge 2 and 3 were added to 300 cc stirred stainless steel pressure reactor at 0.7 ml/min and 0.8 ml/min respectively. The agitation on the reactor was set at 500 rpm and the reactor temperature was adjusted to 210° C. During the monomer addition the temperature was maintained 210° C. at pressure of 400-600 psi. The charge 4 was added to flash tank at 150° C.

The final solids of the resulting star was determined to be 70.7% determined at 110° C. for one hour. The star had number average molecular weight, $M_n=2210$, $M_w=5790$ and polydispersity $M_w/M_n=2.6$, $M_z=12030$ (determined by gel permeation chromatography using polystyrene as a standard). The hydroxyl number was 70.

Example 9

| | Ingredients | Total Mass (grams) |
|---|---|---|
| Charge 1 | Example 2 | 820.00 |
| Charge 2 | 1,6 Hexanediol diacrylate | 53.00 |
| Charge 3 | Di-t-amyl peroxide | 14.00 |
| Charge 3 | Dowanol PM acetate | 70.00 |

Charge 1, 2 and 3 were added to 1-liter stirred stainless steel pressure reactor over 5 min. The agitation on the reactor was set at 500 rpm and the reactor temperature was adjusted to 220° C. During the monomers and initiator addition the temperature was maintained 220° C. at 100-150 psi. The reactor was than cooled to 100° C. and Charge 3 was added to the reactor. The final solids of the star epoxy was determined to be 72% determined at 110° C. for one hour. The macromonomer had number average molecular weight, $M_n=1720$, $M_w=4160$ and polydispersity $M_w/M_n=2.4$, $M_z$=8600 (determined by gel permeation chromatography using polystyrene as a standard). The epoxy equivalent weight was 455.

Example 10

| | Ingredients | Total Mass (grams) |
|---|---|---|
| Charge 1 | Example 3 | 810.00 |
| Charge 2 | 1,6 Hexanediol diacrylate | 18.00 |
| Charge 3 | Di-t-amyl peroxide | 17.00 |
| Charge 3 | Dowanol PM acetate | 60.00 |

Charge 1, 2 and 3 were added to 1-liter stirred stainless steel pressure reactor over 5 min. The agitation on the reactor was set at 500 rpm and the reactor temperature was adjusted to 220° C.

During the monomers and initiator addition the temperature was maintained 220° C. at 100-140 psi. The reactor was than cooled to 100° C. and Charge 3 was added to the reactor. The final solids of the resulting star was determined to be 71% determined at 110° C. for one hour. The star had number average molecular weight, $M_n$=2020, $M_w$=7380 and polydispersity $M_w/M_n$=3.7, $M_z$=21400 (determined by gel permeation chromatography using polystyrene as a standard). The epoxy equivalent weight was 862 and hydroxyl value 60.

Example 11

| | Ingredients | Total Mass (grams) |
|---|---|---|
| Charge 1 | Example 4 | 820.00 |
| Charge 2 | 1,6 Hexanediol diacrylate | 53.00 |
| Charge 3 | Di-t-amyl peroxide | 14.00 |
| Charge 3 | Dowanol PM acetate | 20.00 |

Charge 1, 2 and 3 were added to 1-liter stirred stainless steel pressure reactor over 5 min. The agitation on the reactor was set at 500 rpm and the reactor temperature was adjusted to 220° C.

During the monomers and initiator addition the temperature was maintained 220° C. at 100-140 psi. The reactor was than cooled to 100° C. and Charge 3 was added to the reactor. The final solids of the resulting star was determined to be 70% determined at 110° C. for one hour. The star had number average molecular weight, $M_n$=3010, $M_w$=10970 and polydispersity $M_w/M_n$=3.6, $M_z$=27600 (determined by gel permeation chromatography using polystyrene as a standard). The acid value was 20 and hydroxyl value 42.

Example 12

| | Ingredients | Total Mass (grams) |
|---|---|---|
| Charge 1 | Example 1 | 214.30 |
| | Example 5 | 264.80 |
| Charge 2 | 1,6 Hexanediol diacrylate | 32.00 |
| Charge 3 | Di-t-amyl peroxide | 12.00 |
| Charge 3 | Xylene | 155.00 |

Charge 1, 2 and 3 were added to 1-liter stirred stainless steel pressure reactor over 5 min. The agitation on the reactor was set at 500 rpm and the reactor temperature was adjusted to 220° C.

During the monomers and initiator addition the temperature was maintained 220° C. at 100 psi. The reactor was than cooled to 100° C. and Charge 3 was added to the reactor. The final solids of the resulting star was determined to be 63% determined at 110° C. for one hour. The star had number average molecular weight, $M_n$=2220, $M_w$=5750 and polydispersity $M_w/M_n$=2.6, $M_z$=10500 (determined by gel permeation chromatography using polystyrene as a standard). The hydroxyl value was 84.

Branched Polymer Example

Example 13

| | Ingredients | Total Mass (grams) |
|---|---|---|
| Charge 1 | Example 6 | 200.00 |
| | Dowanol PM acetate | 125.00 |
| Charge 2 | Di-t-amyl peroxide | 30.00 |
| | Dowanol PM acetate | 60.00 |
| Charge 3 | Methyl methacrylate | 300.00 |
| | Acrylic acid | 25.00 |
| Charge 4 | Dowanol PM acetate | 25.00 |

Charge 1 was added a reaction flask equipped with an agitator, a thermocouple, and a $N_2$ inlet, placed under blanket of $N_2$, and heated to 160° C. Charge 2 and 3 was added to flask over 3 hours. During the monomer addition the temperature was maintained at 160° C. After Charge 2 and 3 were in the reactor, the reaction mixture was held for 1 hour. Charge 4 was added to flask. The solids of the graft copolymer was determined to be 73% determined at 110° C. for one hour. The graft copolymer had number average molecular weight, $M_n$=2070 $M_w$=7430 and polydispersity $M_w/M_n$=3.6, $M_z$=20440 (determined by gel permeation chromatography using polystyrene as a standard). The hydroxyl value was 51.8 and acid value 10.

Hyperbranched Polymer Example

Example 14

| | Ingredients | Total Mass (grams) |
|---|---|---|
| Charge 1 | Example 7 | 500.00 |
| | Dowanol PM acetate | 125.00 |
| Charge 2 | Di-t-amyl peroxide | 20.00 |
| | Dowanol PM acetate | 60.00 |
| Charge 3 | Methyl methacrylate | 90.00 |
| | Ethylene glycol dimethacrylate | 35.00 |
| Charge 4 | Dowanol PM acetate | 25.00 |

Charge 1 was added a reaction flask equipped with an agitator, a thermocouple, and a $N_2$ inlet, placed under blanket of $N_2$, and heated to 160° C. Charge 2 and 3 was added to flask over 3 hours. During the monomer addition the temperature was maintained at 160° C. After Charge 2 and 3 were in the reactor, the reaction mixture was held for 1 hour. Charge 4 was added to flask. The solids of the graft copolymer was determined to be 66% determined at 110° C. for one hour. The copolymer had number average molecular weight, $M_n$=2400 $M_w$=30020 and polydispersity $M_w/M_n$=12.5, $M_z$=273450 (determined by gel permeation chromatography using polystyrene as a standard). The hydroxyl value was 25.

Coatings

Example A:

| | Total Mass |
|---|---|
| Ethyl 3-ethoxypropionate | 13.93 |
| TINUVIN 928 | 1.00 |
| CHISORB 328 | 0.35 |
| TINUVIN 123 | 0.50 |
| N-Amyl Alcohol | 6.17 |
| Fumed Silica Dispersion[1] | 5.57 |
| Colloidal Silica Dispersion[2] | 1.76 |
| Example 9[3] | 37.04 |
| CYMEL 202 | 3.73 |
| Polyacid Resin[4] | 28.14 |
| DYNOADD F1 Solution[5] | 0.20 |
| ARMEEN M2C[6] | 0.60 |
| NACURE 4054[7] | 1.01 |
| | 100.00 |

[1]Silica, CAB-O-SIL CT 1206 (CABOT Corporation), dispersed in polyacid half ester reaction Fumed product of Trimethylolpropane, Methyl Hexahydrophthalic Anhydride and Hexahydrophthalic Anhydride (8.9% fumed silica and 28.6% resin) diluted with Amyl Alcohol.
[2]Nissan Chemical MT-ST colloidal silica dispersed in a siloxane polyol resin (83% weight solids in Methyl Amyl Ketone and Methanol).
[3]Acrylic star polymer with epoxy functional groups (45% Glycidyl Methacrylate, 30.6% Methyl Acrylate, 7.6% Butyl Acrylate, 7.6% Isobutyl Acrylate, 1% a-Methyl Styrene, 8.2% 1,6 Hexanediol Diacrylate, 72% weight solids in Dowanol PMA, Mw = 4160, Solid Epoxy Equivalent Weight = 327.
[4]Polyacid half ester of Di-Trimethylolpropane and Methyl Hexahydrophthalic Anhydride made in N-Propanol, Aromatic 100 and N-Amyl Alcohol using procedure disclosed in U.S. Pat. No. 5,256,452.
[5]Flow additive available from DYNO CYTEC (50% weight solids in N-Butyl Acetate and Butyl Cellosolve Acetate.
[6]Dicocoalkylmethylamine available from AKZO Chemicals, Inc.
[7]Alkyl Acid Phosphate available from KING Industries.

Example A was made to 54.3% solids by weight and had a #4 Ford Cup Viscosity of 25 seconds at 23° C.

A black basecoat and Example A clear were applied by SPRAYMATION machine onto steel panels pre-coated with ED 6060 Electrocoat and HP77224ER Primer. These pre-coated panels are available from ACT Test Panels, Inc. of Hillsdale, Mich. The clear was applied to the EVLD 8555 black waterborne basecoat available from PPG Industries. The basecoat was flashed for five minutes at 80° C. before clear application. After clear application the composite coating was allowed to flash for 10 minutes at room temperature before baking for thirty minutes at 141° C. The basecoat dry film thickness was measured to be 0.58 mils and the clear film thickness was 1.87 mils.

The composite coating had very good visual appearance. The clear showed the following measured values: 20° Gloss of 82, a DOI of 98, BYK WAVE SCAN Long Wave of 2.5, Short Wave of 4.3 and a Rating of 9.8.

The composite coating had a measured FISCHER MICROHARDNESS of 120. The clear retained 68% of the original gloss after 10 cycles of Car Wash testing using the AMTEC Car Wash Machine and retained 62% of the original gloss after 10 rubs with 3M nine micron polishing paper using an Atlas CROCKMETER Machine.

Example B

| | Total Mass |
|---|---|
| Ethyl 3-ethoxypropionate | 13.58 |
| AROMATIC 100 | 7.81 |
| N-Butyl Acetate | 2.60 |
| N-Amyl Alcohol | 2.60 |
| TINUVIN 328 | 1.30 |
| CHISORB 353 | 0.26 |
| RESIMENE 741 | 11.84 |
| Example 10[1] | 44.05 |
| Polyacid Resin[2] | 14.97 |
| DYNOADD F1 Solution | 0.21 |
| ARMEEN M2C | 0.52 |
| NACURE 4054 | 0.26 |
| | 100.00 |

[1]Acrylic Star polymer containing both epoxy and hydroxy functional groups (25% Glycidyl Methacrylate, 25% Hydroxypropyl Acrylate, 15% Isobutyl Methacrylate, 10% a-Methyl Styrene, 25% Ethyl Acrylate and 3% 1,6 Hexanediol Diacrylate, 70.8% solids in Amyl Propionate, Mw = 7386, Solid Epoxy Equivalent Weight = 610, Solid Hydroxyl Equivalent Weight = 661.
[2]Polyacid half ester of Trimethylolpropane, Hexahydrophthalic Anhydride and Methyl Hexahydrophthalic Anhydride that was made in N-Butyl Acetate and N-Propanol to 70% weight solids using procedure disclosed in U.S. Pat. No. 5,256,452.

Example B was made to 54.4% solids by weight and had a #4 Ford Cup Viscosity of 29 seconds at 23° C.

A black basecoat and Example B clear were applied by SPRAYMATION machine to steel panels pre-coated with ED 6100H Electrocoat. These pre-coated panels are available from ACT Test Panels, Inc. of Hillsdale, Mich. The clear was applied to the HWH-9517 black waterborne basecoat available from PPG Industries. The basecoat was flashed for five minutes at 80° C. before clear application. After clear application the composite coating was allowed to flash for 10 minutes at room temperature before baking for thirty minutes at 141° C. The basecoat dry film thickness was measured to be 0.58 mils and the clear film thickness was 1.70 mils.

The clear showed the following appearance values: 20° Gloss of 86 and a DOI of 87.

The composite coating had a measured FISCHER MICROHARDNESS of 112. The clear retained 72% of the original gloss after 10 cycles of Car Wash testing using the AMTEC Car Wash Machine.

Example C

| | Total Mass |
|---|---|
| Solvesso 100 | 60.00 |
| TINUVIN 292 | 1.00 |
| TINUVIN 928 | 1.50 |
| Butyl Cellosolve Acetate | 3.00 |
| Example 8[1] | 81.88 |
| High Solids Polyester[2] | 11.11 |
| BYK-306 | 0.25 |
| CYMEL 202 | 10.00 |
| DES N3300A | 24.13 |
| PAP[3] | 0.67 |
| | 193.53 |

[1]Acrylic star polymer with hydroxyl functional groups (23.3% Hydroxypropyl Acrylate, 25.2% Methyl Acrylate, 9.7% Isobutyl Acrylate, 14.5% a-Methyl Styrene, 24.2% Isobutylene, 3.0% 1,6 Hexanediol Diacrylate, 70% weight solids in Aromatic 100, Mw = 5790, Solid Hydroxyl Equivalent Weight = 801.
[2]Polyester resin of Neopentyl Glycol and Hexahydrophthalic Anhydride made in Xylene.
[3]Phenyl Acid Phosphate available from Rhodia.

A black basecoat and Example C clear were applied by SPRAYMATION machine onto 4"×12" TRU steel panels, available from ACT Test Panels, Inc. of Hillsdale, Mich. The clear was applied to the Schwarz black waterborne basecoat available from BASF Corp. The basecoat was flashed for seven minutes at 141° C. before clear application. After clear application the composite coating was allowed to flash for 10 minutes at room temperature before baking for thirty minutes at 141° C. The basecoat dry film thickness was measured to be 0.5 mils and the clear film thickness was 1.7 mils.

The composite coating had very good visual appearance. The clear showed the following measured values: 20° Gloss of 86, a DOI of 88, BYK WAVE SCAN Long Wave of 5.3, Short Wave of 27.9 and a Rating of 8.2.

The composite coating had a measured FISHER MICROHARDNESS of 122. The clear retained 76% of the original gloss after 10 cycles of Car Wash testing using the AMTEC Car Wash Machine and retained 9% of the original gloss after 10 rubs with 3M nine micron polishing paper using an Atlas CROCKMETER Machine.

Example D

|  | Total Mass |
| --- | --- |
| Methyl n-Amyl Ketone | 20.42 |
| Xylene | 1.29 |
| Aromatic-100 | 4.78 |
| Butyl Cellosolve Acetate | 20.32 |
| Hexyl Cellosolve | 0.63 |
| Eversorb 76 | 1.49 |
| CHISORB 328 | 1.49 |
| Colloidal Silica Dispersion[1] | 16.88 |
| Ethanol | 5.48 |
| Poly Butylacrylate | 0.69 |
| Multiflow[2] | 0.47 |
| Resimene-757 | 32.99 |
| Example 8[3] | 74.84 |
| Catalyst Grind[4] | 1.92 |
|  | 183.58 |

[1]Nissan Chemical MT-ST colloidal silica dispersed in a siloxane polyol resin (83% weight solids in Methyl Amyl Ketone and Methanol).
[2]Poly 2-ethylhexyl acrylate/hexyl acrylate flow additive made in xylene at 50% solids, manufactured by Cytec Industries.
[3]Acrylic star polymer with hydroxyl functional groups (23.3% Hydroxypropyl Acrylate, 25.2% Methyl Acrylate, 9.7% Isobutyl Acrylate, 14.5% a-Methyl Styrene, 24.2% Isobutylene, 3.0% 1,6 Hexanediol Diacrylate, 70% weight solids in Aromatic 100, Mw = 5790, Solid Hydroxyl Equivalent Weight = 801.
[4]Dodecylbenzene sulfonic acid catalyst/hinder amine light stabilizer mixture in ethanol at 53% solids.

Example D was made to 57.7% solids by weight and had a #4 Ford Cup Viscosity of 28 seconds at 74° F.

A black basecoat and Example D clear were applied by SPRAYMATION machine onto 4"×12– steel panels pre-coated with ED 6061 Electrocoat, available from ACT Test Panels, Inc. of Hillsdale, Mich. The clear was applied to HMB-301134 silver waterborne basecoat available from PPG Industries. The basecoat was flashed for five minutes at room temperature and then for three minutes at 82° C. before clear application. After clear application the composite coating was allowed to flash for 10 minutes at room temperature before baking for thirty minutes at 141° C. The basecoat dry film thickness was measured to be 0.7 mils and the clear film thickness was 1.7 mils.

The composite coating had very good visual appearance. The clear showed the following measured values: 20° Gloss of 95, a DOI of 88, BYK WAVE SCAN Long Wave of 3.2, Short Wave of 9.0 and a Cf rating of 59.3. The composite coating had a measured FISHER MICROHARDNESS of 108.

Example E

|  | Total Mass |
| --- | --- |
| Methyl n-Amyl Ketone | 17.19 |
| Xylene | 1.29 |
| Aromatic-100 | 4.78 |
| Butyl Cellosolve Acetate | 28.75 |
| Hexyl Cellosolve | 0.63 |
| Eversorb 76 | 1.49 |
| CHISORB 328 | 1.49 |
| Colloidal Silica Dispersion[1] | 16.88 |
| Ethanol | 5.48 |
| Polybutylacrylate | 0.69 |
| Multiflow[2] | 0.47 |
| Resimene-757 | 32.99 |
| Example 14[3] | 94.51 |
| Catalyst Grind[4] | 1.92 |
|  | 182.39 |

[1]Nissan Chemical MT-ST colloidal silica dispersed in a siloxane polyol resin (83% weight solids in Methyl Amyl Ketone and Methanol).
[2]Poly 2-ethylhexyl acrylate/hexyl acrylate flow additive made in xylene at 50% solids, manufactured by Cytec Industries.
[3]Acrylic linear polymer with hydroxyl functional groups (9.3% 4-Hydroxybutyl Acrylate, 37.3% Butyl Acrylate, 16.1% Methyl Methacrylate, 11.7% a-Methyl Styrene, 19.4% Isobutylene, 6.3% Ethyleneglycol Dimethacrylate, 66% weight solids in Butyl Acetate/Dowanoly PM Acetate, Mw = 30020, Solid Hydroxyl Equivalent Weight = 2244.
[4]Dodecylbenzene sulfonic acid catalyst/hinder amine light stabilizer mixture in ethanol at 53% solids.

Example E was made to 58.05% solids by weight and had a #4 Ford Cup Viscosity of 30.4 seconds at 73° F.

A black basecoat and Example E clear were applied by SPRAYMATION machine onto 4"×12– steel panels pre-coated with ED 6061 Electrocoat, available from ACT Test Panels, Inc. of Hillsdale, Mich. The clear was applied to HMB-301134 silver waterborne basecoat available from PPG Industries. The basecoat was flashed for five minutes at room temperature and then for three minutes at 82° C. before clear application. After clear application the composite coating was allowed to flash for 10 minutes at room temperature before baking for thirty minutes at 141° C. The basecoat dry film thickness was measured to be 0.7 mils and the clear film thickness was 1.8 mils.

The composite coating had very good visual appearance. The clear showed the following measured values: 20° Gloss of 93, a DOI of 87, BYK WAVE SCAN Long Wave of 1.1, Short Wave of 12.7 and a Cf rating of 67.2. The composite coating had a measured FISHER MICROHARDNESS of 16.

Example F

|  | Total Mass |
| --- | --- |
| BYK-300[1] | 0.15 |
| EVERSORB 74[2] | 1.47 |
| SANOL LS-292/BLS 292[3] | 2.02 |
| DABCO T-12[4] | 0.20 |

-continued

| | Total Mass |
|---|---|
| Example 12[5] | 63.66 |
| ISOCYANATE HARDENER[6] | 32.50 |
| | 100.00 |

[1]Flow additive available from BYK-CHEMIE (52% weight solids in Xylene and isobutanol.
[2]Ultra-violet absorber available from CIBA Additives (Benzotriazole 100% weight solids).
[3]Hindered Amine Light Stabilizer available from SANKYO, Co. (100% weight solids Pentamethyl-4-Piperidinyl sebacates).
[4]DIbutyl tin dilaurate catalyst available from Air Products & Chemicals, Inc.
[5]Acrylic Star polymer containing hydroxy functional groups (63% weight solids).
[6]Desmodur N3600/Desmodur Z4470 Blend (55/45 weight ratio) available from Bayer Material Science, Inc.

Example F was made to 49.64% weight solids with the addition of solvents (blend of Dowanol PM Acetate, Xylene, MIBK and Acetone) for spray application. The solution had a Brookfield viscosity of 33 centipoise at 25° C.

DELTRON DBC 3964 Sapphire Blue basecoat and Example F clearcoat were applied by a DeVilbiss GTI-620G HVLP hand spray gun onto steel panels pre-coated with ED 6060 Electrocoat and HP77224ER Primer. These pre-coated panels are available from ACT Test Panels, Inc. of Hillsdale, Mich. The basecoat was ambient cured prior to clearcoat application. The clear coat was applied to the basecoat and ambient cured one week prior to testing. The basecoat dry film thickness was measured to be 0.50 mils and the clear film thickness was 2.3 mils (57.5 microns).

The composite coating had a measured Konig Pendulum hardness$^a$ of 23 and a measured 20° Gloss$^b$ of 91.9. The clearcoat had a taped adhesion$^c$ rating of 5 (50% retention over the basecoat) and a tack-free time$^d$ of 75 minutes. These tests were conducted according to:

$^a$ASTM D4366 Standard Test Method for Hardness of Organic Coatings by Pendulum Damping Tests
$^b$ASTM D3359 Standard Test Method for Measuring Adhesion by Tape Test
$^c$ASTM D523 Standard Test Method for Specular Gloss
$^d$Variant of ASTM C679 Standard Test Method for Tack-Free Time of Elastomeric Sealants—for clear coatings.

What is claimed is:

1. A coating composition comprising a polymer that comprises an oligomeric macromonomer and a core from which said oligomeric macromonomer extends, wherein said oligomeric macromonomer comprises reactive functional groups and has an average functionality ranging from 1.0 to 30.0 and a molecular weight of ≧1,000 and ≦4160, and wherein said core is <10 weight % of the total polymer weight and wherein the polymer is formed by adding the oligomeric macromonomer to a (meth)acrylate monomer comprising at least two ethylenically unsaturated double bonds to form a mixture and polymerizing the mixture; wherein the core comprises the residue of the (meth)acrylate monomer; and wherein the coating composition further comprises a curing agent that is reactive with the reactive functional groups of the oligomeric macromonomer.

2. The coating composition according to claim 1, wherein said oligomeric macromonomer has a molecular weight ranging from 1,000 to 2,000.

3. The coating composition according to claim 2, wherein said oligomeric macromonomer has a molecular weight ranging from 1,400 to 1,600, and wherein said oligomeric macromonomer has an average functionality of 2.2 to 2.6.

4. The coating composition according to claim 1, wherein said oligomeric macromonomer comprises ≧5 weight % functionalized monomers.

5. The coating composition according to claim 1, wherein said polymeric core comprises ≦5 weight % of the total polymer weight and said oligomeric macromonomer comprises ≧95 weight % of the total polymer weight.

6. The coating composition according to claim 1, wherein said oligomeric macromonomer is a free radical polymerization reaction product of: (a) a monomer comprising an α-hydrogen; (b) a first free radical polymerization initiator; and, optionally, (c) a monomer that is polymerizable with (a).

7. The coating composition according to claim 6, wherein (a) comprises acrylate, alkyl acrylate, hydroxy alkyl acrylate, or combinations thereof.

8. The coating composition according to claim 6, wherein (c) comprises methacrylate, alkyl methacrylate, hydroxy alkyl methacrylate, glycidyl methacrylate or combinations thereof.

9. The coating composition according to claim 6, wherein said (b) initiator comprises <1 weight % of the total weight of (a); (b); and (c), if used.

10. The coating composition according to claim 1, wherein said polymer comprises ≧4 weight % functionalized monomers.

11. The coating composition according to claim 1, wherein said coating composition is a 2K composition, and wherein said polymer is in one component and said curing agent is in another component.

12. The coating composition according to claim 1, wherein said coating composition comprises an additional film forming polymer.

13. The coating composition according to claim 1, wherein said coating composition is a 1K composition.

14. The coating composition according to claim 1, wherein said coating composition is an electrodepositable coating composition.

15. The coating composition according to claim 1, wherein said coating composition comprises a colorant.

16. The coating composition according to claim 1, wherein said coating composition is substantially clear.

17. The coating composition according to claim 16, wherein said oligomeric macromonomer comprises glycidyl methacrylate, isobutyl acrylate, and isobutyl methacrylate.

18. A substrate coated at least in part with the coating composition of claim 1.

19. The substrate according to claim 18, wherein said substrate comprises a portion of a vehicle.

20. A coating composition comprising a branched polymer that comprises an oligomeric macromonomer and a backbone from which said oligomeric macromonomer extends, and wherein said oligomeric macromonomer comprises reactive functional groups and has an average functionality of 1.0 to 30.0 and a molecular weight ≧1,000 and has a terminal ethylenically unsaturated double bond; and
wherein the branched polymer is formed by adding the oligomeric macromonomer to a (meth)acrylate monomer comprising one ethylenically unsaturated double bond to form a mixture and polymerizing the mixture; and wherein the backbone comprises the residue of the (meth)acrylate monomer; and wherein the coating composition further comprises a curing agent that is reactive with the reactive functional groups of the oligomeric macromonomer; and
wherein the oligomeric macromonomer that extends from the backbone forms a primary branch, and a secondary branch extends from said primary branch.

21. The coating composition according to claim 20, wherein said branched polymer comprises ≧20 weight % functionalized monomers.

22. The coating composition according to claim 20, wherein said oligomeric macromonomer has a molecular weight ranging from 1,000 to 5,000.

23. The coating composition according to claim 22, wherein said oligomeric macromonomer has a molecular weight ranging from 1,400 to 1,600 and an average functionality of 4.3 to 5.0.

24. The coating composition according to claim 20, wherein said oligomeric macromonomer is a free radical polymerization reaction product of: (a) a monomer comprising an α-hydrogen; (b) a free radical polymerization initiator; and, optionally, (c) a monomer that is polymerizable with (a).

25. The coating composition according to claim 24, wherein (a) comprises acrylate, alkyl acrylate, hydroxy alklyl acrylate, or combinations thereof.

26. The coating composition according to claim 24, wherein (c) comprises methacrylate, alkyl methacrylate, hydroxy alkyl methacrylate, glycidyl methacrylate, or combinations thereof.

27. The coating composition according to claim 24, wherein the molar ratio of (a) to (c), when used, ranges from 1:5 to 99:1.

28. The coating composition according to claim 20, wherein said coating composition is a 2k composition, and wherein said polymer is in one component and said curing agent is in another component.

29. The coating composition according to claim 20, wherein said coating composition comprises an additional film forming polymer.

30. The coating composition according to claim 20, wherein said coating composition is a 1K composition.

31. The coating composition according to claim 20, wherein said coating composition is an electrodepositable coating composition.

32. The substrate according to claim 31, wherein said substrate comprises a portion of a vehicle.

33. The coating composition according to claim 20, wherein said coating composition comprises a colorant.

34. The coating composition according to claim 20, wherein said coating composition is substantially clear.

35. The coating composition according to claim 34, wherein said oligomeric macromonomer comprises glycidyl methacrylate, isobutyl acrylate, isobutyl methacrylate, and methyl acrylate.

36. A substrate coated at least in part with the coating composition of claim 20.

* * * * *